Feb. 2, 1960      B. SILVERMAN      2,923,834
MAGNETIC DELAY ELEMENT
Filed Dec. 28, 1956
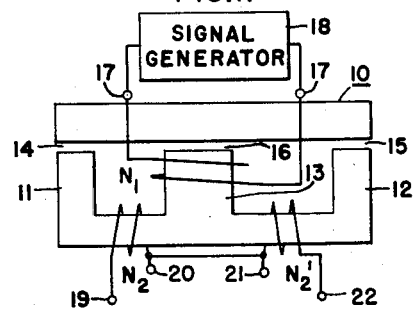
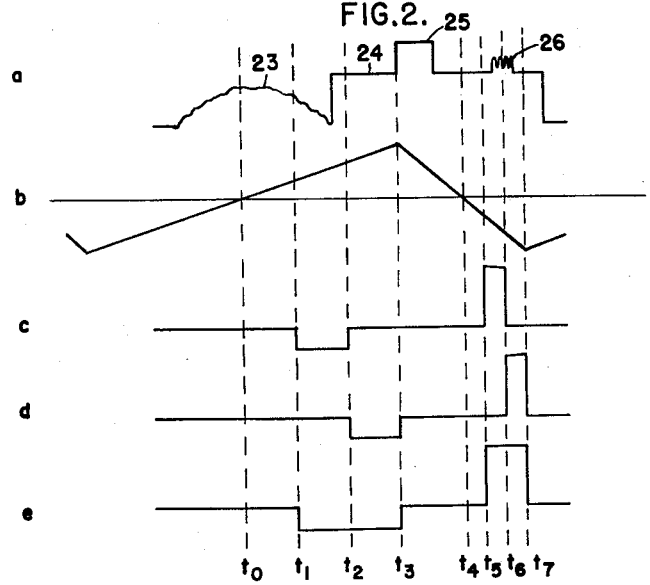
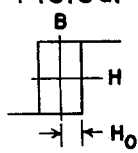
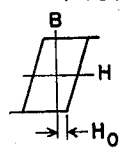
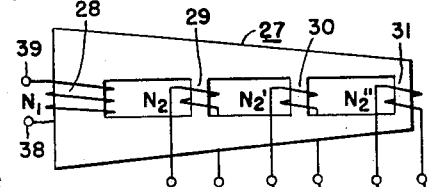
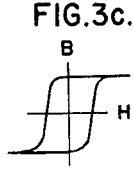
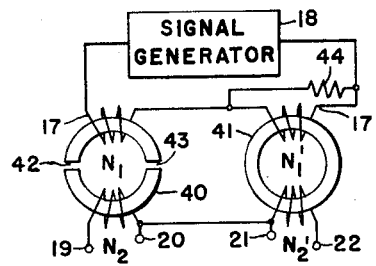
INVENTOR:
BERNARD SILVERMAN,
BY Robert J. Stenmeyer
HIS ATTORNEY.

United States Patent Office 2,923,834
Patented Feb. 2, 1960

2,923,834

MAGNETIC DELAY ELEMENT

Bernard Silverman, Syracuse, N.Y., assignor to General Electric Company, a corporation of New York Application December 28, 1956, Serial No. 631,147

12 Claims. (Cl. 307—88)

My invention relates to a magnetic delay element which during each single pulse or cycle of an input current or voltage source supplies a series of time related output pulses which may be added in series or employed individually to perform time dependent functions.

The employment of a single path magnetic saturable reactor as a timing or delay element is disclosed in a copending application, Ser. No. 631,167 of Benjamin G. Walker assigned to the assignee of the present invention and filed concurrently herewith.

Delay elements find application in many arts, one of which is color television wherein it is necessary to provide delay for isolating the color "burst" from the rest of a received signal in order to eliminate components of substantially the same frequency as the color burst from the color burst amplifier. The color burst is located in the signal after the horizontal synchronizing pulse upon the pedestal carrying the horizontal synchronizing pulse and occurs during the blanking period or flyback time of the horizontal sweep. Previously, in order to isolate the color burst from the remainder of the received signal, relatively complicated circuitry has been used in order to achieve the proper delay.

In other areas such as pulse communication systems, radar range gates and digital circuitry, it is also desirable to be able to derive a series of time coordinated output pulses from an input signal in order to perform time related functions. In involved circuits of this nature, reliability, space and weight problems are often serious. It is therefore an object of my invention to provide improved means to perform these functions and to reduce space and weight and greatly increase reliability in the circuitry employed.

Another object of my invention is to provide a multi-path magnetic delay element which will provide a series of time related output pulses which may be either added or taken off individually as desired.

Still another object of my invention is to employ a magnetic delay element in order to achieve the above-mentioned color burst delay.

A further object of my invention is to provide a versatile magnetic delay element which is highly reliable, small and light.

A still further object of my invention is to employ a magnetic delay element having multiple paths in order to achieve a desired gating pulse width and waveshape as well as a desired delay.

In carrying out my invntion in one form thereof, I employ a three-legged magnetic core having an inside leg positioned off center in order to provide two parallel magnetic paths having different lengths. Small air gaps are placed in all three legs. An input winding is wound on the inside leg and separate output windings are wound on each of the portions of the core exterior to the inside leg. These output windings are connected in series aiding. When an alternating input current, of sufficient magnitude to saturate the paths in both directions, flows through the input winding, a delayed output pulse appears across the output windings. The total output voltage pulse represents the sum of the voltages induced in the output windings when each path is passing through the unsaturated region and appears a predetermined time after the change in polarity of the input current.

The novel features which I believe to be characteristic of my invention are set forth with particularity in the appended claims. My invention itself, however, together with further objects and advantages thereof can best be understood by reference to the following description taken in connection with the accompanying drawing in which Fig. 1 is an illustration of one embodiment of my invention; Fig. 2 is a diagram illustrating the relationships between the various currents and voltages during the operation of the embodiment shown in Fig. 1; Fig. 3 is an illustration of hysteresis loops exhibited by theoretical and practical magnetic cores employed in my invention: Fig. 4 is a generalized embodiment of my invention; Fig. 5 illustrates an alternative embodiment of my invention employing different core structure.

Referring specifically now to the embodiment of Fig. 1, I have shown a core 10 preferably made from a magnetic material having a substatially rectangular hysteresis loop. Core 10 has three legs, two outer legs 11 and 12 and an inside leg 13. The inside leg 13 is placed off center as shown. An input winding $N_1$ is wound on inside leg 13. The core 10 has two parallel magnetic paths or circuits including inside leg 13 as the common leg. A winding $N_2$ is wound on and inductively coupled to the parallel magnetic path including the outside leg 11, externally to the inside leg 13. A winding $N_2'$ is wound on the parallel magnetic path including the outside leg 12, externally to inside leg 13. The winding $N_1$ has two terminals 17 to which a signal generator 18 is connected. Winding $N_2$ has terminals 19 and 20 and winding $N_2'$ has terminals 21 and 22. Windings $N_2$ and $N_2'$ are connected in series aiding by connecting terminals 20 and 21. An output can then be taken from terminals 19 and 22. Alternatively, generator 18 can be connected to terminals 19 and 22 across the series combination of $N_2$ and $N_2'$, and terminals 17 can serve as output terminals. In addition, the connection of terminals 20 and 21 may be used as a common terminal between windings $N_2$ and $N_2'$ for a purpose which will be more fully explained hereinafter.

The operation of the above-described magnetic delay element of my invention may conveniently be understood by considering its use as a delay element to derive a gating pulse for a color burst amplifier in a color television receiver. When an alternating current input signal is applied by signal generator 18 to winding $N_1$ at terminals 17, the magnetic field intensity or magnetizing force is greater in the shorter magnetic path of core 10, that is in the magnetic path above-described including the outside leg 11, since the path length of this magnetic path is shorter and the number of ampere-turns passing through the input winding $N_1$ is equivalent in both magnetic paths. Due to the differences in magnetic field intensities, the times required to drive the two magnetic paths out of saturation after the reversal of the input current, or the delay times, will differ.

In Fig. 2a there is illustrated a television receiver input signal, the leading portion of which contains picture information 23. A pedestal 24 contains the horizontal synchronizing pulse 25 followed by a burst 26 of color synchronization information which it is desired to supply to a color burst amplifier (not shown). It is necessary to isolate the color burst 26 from the other portions of the input signal in order to eliminate harmonics of substantially the same frequency as the color burst from the amplifier. To do this the color burst amplifier is gated on by a voltage pulse which is approximately coextensive in time with color burst 26.

In order to obtain this desired gating pulse I utilize the saw tooth sweep current, illustrated in Fig. 2b, derived from a signal generator or oscillator which is controlled by the horizontal synchronizing pulse 25 of Fig. 2a. The horizontal sweep current of Fig. 2b is supplied to terminals 17 of input winding $N_1$ of core 10 of Fig. 1, the magnitude being controlled so as to be sufficient to saturate both magnetic paths alternately in both directions. At time $t_0$ in Fig. 2 the sweep current passes through zero and changes polarity. Assuming that the magnetic path including leg 11 has been saturated in a negative direction prior to $t_0$, sufficient magnetic field intensity or magnetizing force will have been applied thereto by time $t_1$ to drive this magnetic path out of negative saturation and to cause a voltage to appear across the winding $N_2$, as is illustrated in Fig. 2c. By time $t_2$ the magnetic path containing the outside leg 11 is driven back into saturation in the positive direction and the output voltage across the winding $N_2$ disappears. However, at this time the path containing the outside leg 12 has received sufficient magnetizing force to drive it out of negative saturation and a voltage appears across the winding $N_2'$ as is illustrated in Fig. 2d. At time $t_3$ the path containing the outside leg 12 is driven back into positive saturation and the voltage across winding $N_2'$ disappears. Since windings $N_2$ and $N_2'$ are connected in series aiding, a composite output voltage pulse is derived, as shown in Fig. 2e, which constitutes the sum of the voltages across the windings $N_2$ and $N_2'$ between the times $t_1$ and $t_3$.

At time $t_4$ the polarity of the sweep current of Fig. 2b again changes and shortly thereafter, at time $t_5$, the path containing the outside leg 11 is driven out of positive saturation and a pulse appears across the winding $N_2$ as is shown in Fig. 2c. At time $t_6$ this path returns to negative saturation and the voltage across the winding $N_2$ disappears. The path containing the outside leg 12 is then driven out of positive saturation and a voltage appears across the winding $N_2'$ as is shown in Fig. 2d. At time $t_7$ this path returns to negative saturation and the voltage disappears from the winding $N_2'$. As previously, these voltages across the windings $N_2$ and $N_2'$ are again added to achieve a composite output voltage pulse, shown in Fig. 2e, between the times $t_5$ and $t_7$. This composite pulse is of shorter duration than the composite pulse appearing across the combined output during the time $t_1$ and $t_3$; however, it is of greater magnitude since the volt-time integrals of these two pulses are equal. This difference in pulse height is caused by the greater slope of the sweep signal current of Fig. 2b during the flyback time from $t_4$ to $t_7$, since the rate of change of flux is dependent on the rate of change of current in the input winding. The gating circuit of the color burst amplifier (not shown) requires a pulse of the polarity and order of magnitude of that shown between times $t_5$ and $t_7$ in Fig. 2d to keep it gated on.

If it is desired to obtain individual time related output pulses instead of the sum as shown and described above for "pulse stretching" purposes, individual pulses as illustrated in Figures 2c and 2d can be obtained by connecting a suitable utilization device (not shown) to the free terminals 19 and 22 with terminal 20 or terminal 21 used as a reference or common terminal. Such a utilization device requiring separated pulses rather than a composite pulse could consist of a radar range gate in which separate time related pulses are used to periodically gate the portion of the range visible on a radarscope through a series of outward steps. Another device could consist of a pulse communications system in which a series of pulses might be desired to indicate presence or absence or magnitude of an applied signal. Also in pulse communications a signal is often transmitted as a series of spaced pulses instead of a composite signal in order to place more than one signal on a channel by superimposing and later unscrambling signals. In digital circuitry an input might be integrated and added or subtracted, the position of the last output pulse yielding a digital representation of the input and also possibly performing an analogue to digital conversion. In digital applications a core having ten magnetic circuits could provide decimal representation.

The amount of delay achieved by this device is determined by the time it takes to drive the core out of saturation after a reversal in the input current. I have illustrated in Fig. 3a an ideal hysteresis loop of a core having a rectangular loop. In this figure, $H_0$ illustrates the amount of magnetic field intensity or magnetizing force necessary to drive the core out of saturation when proceeding up the right-hand side of the loop after the change in direction of input current. The magnetizing force $H_0$ is equal to a constant times the current or, more specifically, to a constant times the current times the number of winding turns divided by the path length. Thus the delay may be changed by changing the magnetizing force, which in turn, may be changed by altering the number of turns in the input winding or by changing the respective path lengths.

Introducing a gap into a core having a rectangular loop similar to that shown in Fig. 3a, alters the loop in a manner illustrated in Fig. 3b by increasing the slope of the loop. This tends to increase the duration of the output pulse or the duration of the time that the core remains out of saturation. Also $H_0$ and the delay are reduced. As an alternative, the delay can be controlled electrically by means of a bias current supplied to one of the existing windings or to a separate bias winding on the core.

The amplitude of the output signal of the embodiment of Fig. 1 may be varied by changing the number of turns on the windings $N_2$ and $N_2'$. If it is desired to provide equal output voltages in each winding, each must have a different number of turns since the lengths of the two magnetic paths are unequal.

The addition of two pulses having different delay times to produce a composite delayed pulse has been found necessary in the above-described burst gate application, since the time duration of the individual pulses may not be long enough and since in practice the use of typical magnetic material and the introduction of the air gaps causes the upper portion of the right-hand side of the hysteresis loop to assume an S-type characteristic, as is illustrated in Fig. 3c. This causes the trailing edge of a single output pulse to be tapered in a manner which does not approach the square wave pulse desired for gating purposes. The addition of the two pulses in accordance with one aspect of my invention more nearly approaches the desired square wave pulse shape. By the addition of more paths other wave shape characteristics can be achieved.

A typical set of values for the embodiment of Fig. 1 employed in one application of my invention is as follows: the core 10 is 1/8" thick throughout; the upper and lower portions of the core 10 are 1/8" in width; outside legs 11 and 12 are 1/8" wide and 3/16" high; inside leg 13 is 5/16" wide and 3/16" high. Legs 11, 12, 13 have air gaps 14, 15, and 16 respectively, of the order of 0.001". The inside distance between the legs 11 and 12 is 3/16" and between the legs 12 and 13, 1 1/8" and thus the overall length of the lower and upper branches is 2". Core 10 is composed of ferrite material having a substantially rectangular hysteresis loop with characteristics similar to "General Ceramic S-1" material or other comparable material. As an alternative, magnetic metals exhibiting approximately rectangular hysteresis loops can be used if the core structure is laminated. The respective windings have the following turns and wire sizes:

Winding $N_1$ ---------------- 14 turns #31 Cu wire
Winding $N_2$ ---------------- 80 turns #36 Cu wire
Winding $N_2'$ ---------------- 240 turns #36 Cu wire Fig. 4 illustrates an alternative core structure employing the addition of more paths as mentioned above. A core 27 has an input leg 28 and three output legs 29, 30 and 31. The input leg 28 has an area at least equal to those of the combined output legs 29, 30 and 31 in order to allow their complete saturation. The core 27 may also be tapered as shown since the minimum required areas of the upper and lower portions must be greater to the left of leg 29 than of 30, etc., again in order to saturate all output legs. An input winding $N_1$ is wound on input leg 28 and output windings $N_2$, $N_2'$ and $N_2''$ are wound on legs 29, 30 and 31 respectively. Winding $N_2$ has terminals 32 and 33, winding $N_2'$ has terminals 34 and 35 and winding $N_2''$ has terminals 36 and 37. Input winding $N_1$ has terminals 38 and 39.

An input signal applied to terminals 38 and 39 in the proper polarity to reverse the saturation of the presaturated output legs 29, 30 and 31 first drives leg 29 through the unsaturated region, then leg 30 and lastly leg 31. During the excursion through the unsaturated region of these legs, sequential output pulses are generated in windings $N_2$, $N_2'$ and $N_2''$. These pulses may be added in series by connecting together terminals 33 and 34 and also connecting together terminals 35 and 36. If it is desired to use the pulses separately, terminals 32, 34 and 36 may be connected to provide a common terminal and sequential outputs taken from terminals 33, 35 and 37.

By modifying the input voltage to winding $N_1$ the time of the initial output pulse across winding $N_2$ may be varied. For instance, a square wave of large magnitude generates an output pulse across $N_2$ substantially simultaneously with its application. By proper design of the parameters the output pulses can be made to either directly follow one another or to be spaced in time from each other. Application of electrical biases to the legs 29, 30 and 31 can also be utilized to position the respective output pulses in time as desired.

As illustrated in Fig. 4 the core 27 has no air gaps. This may be advantageous if it is desired to obtain a series of short pulses which need not meet critical width requirements, because an air gap tends to cause the hysteresis loop to take more of the shape illustrated in Fig. 3c with the S-shaped portions which hinder sharp leading and trailing edge resolution.

The alternative embodiment of Fig. 5 employs two toroidal cores 40 and 41, the core 40 having air gaps 42 and 43 and the core 41 having no air gap. An input winding $N_1$ is wound on core 40 and an input winding $N_1'$ is wound on core 41. Windings $N_1$ and $N_1'$ are connected in series aiding to signal generator 18 across terminal 17 with a resistor 44 shunted across winding $N_1'$. An output winding $N_2$ is wound on core 40 and an output winding $N_2'$ is wound on core 41. These output windings $N_2$ and $N_2'$ may be connected as illustrated in series aiding to output terminals 19 and 22 to secure composite output pulses by connecting terminals 20 and 21, or alternatively, individual output voltages may be obtained by separate connections to free terminals 19 and 20 and common terminal 20 or 21 in a manner herein before explained. In the embodiment of Fig. 5 the delay between the two magnetic paths can be varied in three ways. In the core 40 air gaps 42 and 43 can be employed to tilt the hysteresis loop in a manner illustrated in Fig. 3b for the purpose of reducing $H_0$ and the resulting delay due to the core 40. On the other hand, the delay produced by core 41 can be increased by reducing the number of turns on the signal winding $N_1'$ and by shunting a portion of the signal current to the winding $N_1'$ through resistor 44. If required for any particular application, the number of turns on the output windings $N_2$ and $N_2'$ can be adjusted to give voltages of equal magnitudes when the respective cores 40 and 41 are out of saturation.

I have described one specific embodiment of my invention to be employed as a delay element in a color television receiver. However, it will be apparent from the discussion of the other embodiments that the delay element embodying my invention has several possible applications, such as in the pulse communication systems, radar range gates, and digital circuitry applications mentioned. Thus, while I have shown particular embodiments of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. An electrical signal delay device comprising a plurality of magnetic circuits, input winding means inductively coupled to said magnetic circuits, means for supplying said input winding means with an input signal of reversible polarity having sufficient magnitude to saturate at least a portion of each of said magnetic circuits first in one direction and then in the opposite direction, each of said circuits having a combined reluctance and ampere-turn energization different from the remaining circuits whereby each circuit unsaturates and saturates respectively at different times from the remaining circuits during application of said signal, and output winding means coupled to each of said magnetic circuits for deriving a reversible output signal during the times said circuits are in their respective unsaturated conditions.

2. An electrical signal delay device comprising a plurality of magnetic circuits, input winding means inductively coupled to said magnetic circuits, means for supplying said input winding means with an input signal of sufficient magnitude and of proper polarity to saturate at least a portion of each of said magnetic circuits first in one direction and then in the opposite direction, each of said circuits having a combined reluctance and ampere-turn energization different from the remaining circuits whereby each circuit unsaturates and saturates respectively at different times from the remaining circuits during application of said signal, and output winding means respectively coupled to the portion of each of said magnetic circuits which saturates and unsaturates during application of said signal.

3. An electrical signal delay device comprising a plurality of magnetic circuits, input winding means inductively coupled to said magnetic circuits, means for supplying said input winding means with an input signal of sufficient magnitude and of proper polarity to saturate at least a portion of each of said magnetic circuits first in one direction and then in the opposite direction, each of said circuits having a combined reluctance and ampere-turn energization different from the remaining circuits whereby each circuit unsaturates and saturates respectively at different times from the remaining circuits during application of said signal, and output winding means respectively coupled to the portion of each of said magnetic circuits which saturates and unsaturates during application of said signal, said output winding means each having at least two terminals from which a pulse may be taken while the magnetic circuit to which such output winding means is coupled is driven from saturation in said one direction to saturation in said opposite direction.

4. The device of claim 3 in which said input signal is a reversible square wave voltage having negligible rise time in order to initiate an output substantially simultaneously with the application of said input signal.

5. An electrical signal delay device comprising a plurality of magnetic circuits, input winding means inductively coupled to said magnetic circuits, means for supplying said input winding means with alternating current of sufficient magnitude to cause saturation of at least a portion of each of said magnetic circuits, each of said circuits having a combined reluctance and ampere-turn energization different from the remaining circuits whereby each circuit saturates and unsaturates at different times from the remaining circuits during each cycle of input alternating current, and output winding means coupled to each of said magnetic circuits for deriving a composite rectangular output voltage pulse representing the addition of the voltage pulses which are time-sequentially induced in the output winding means as each magnetic circuit passes through an unsaturated region.

6. An electrical signal delay device comprising a plurality of magnetic circuits, input winding means inductively coupled to said magnetic circuits, means for supplying said input winding means with a saw tooth alternating current of sufficient magnitude to cause saturation of at least a portion of all said magnetic circuits, each of said circuits having a combined reluctance and ampere-turn energization different from the remaining circuits whereby each circuit saturates and unsaturates at different times from the remaining circuits during each cycle of input alternating current, and output winding means coupled to each of said magnetic circuits, each of said output winding means having two terminals, said terminals connecting said output winding means in series aiding for deriving a composite rectangular output voltage pulse representing the addition of the voltage pulses which are time-sequentially induced in the output winding means as each magnetic circuit passes through an unsaturated region.

7. An electrical signal delay device comprising a three-legged magnetic core having an inside leg shifted off center defining two magnetic paths of different lengths, input winding means inductively coupled to said core, a saw tooth current input signal generator connected to said input winding means, the signal from said generator having a magnitude sufficient to saturate at least a portion of said paths alternately in both directions and sufficient to drive said paths individually out of saturation after the change in polarity of said signal at different preselected times determined by their magnetic field intensities, output winding means inductively coupled to said core in order to obtain a continuous substantially rectangular output pulse composed of the addition of the voltages transformed across the separate paths during the time each path is passing through the unsaturated region, one of said winding means being wound on said inside leg and the other including two separate windings connected in series aiding each wound on a different one of said paths external to said inside leg.

8. The device of claim 7 in which each of said legs has an air gap therein.

9. A burst gate delay circuit for color television receivers comprising a three-legged rectangular magnetic core having an inside leg shifted off center defining two magnetic paths of different lengths, said inside leg having a greater cross section than either of the remaining legs, an input winding on said inside leg, a saw tooth current input signal generator connected to said input winding, the signal from said generator having a magnitude sufficient to saturate at least a portion of said paths alternately in both directions and sufficient to drive said paths individually out of saturation after the change in polarity of said signal at different preselected times determined by their magnetic field intensities, a separate output winding on the portion of each of said magnetic paths external to said inside leg, said output windings being connected in series aiding, whereby a substantially rectangular output pulse appears across said series outputs windings composed of the addition of the voltages transformed across the paths when they pass through the unsaturated region, said output pulse being timed to coincide with the time of the color burst on a received television signal and being used to gate a color burst amplifier.

10. The circuit of claim 9 in which each of said three legs has an air gap of substantially equal magnitude therein.

11. An electrical signal delay device comprising a saturable magnetic core having a substantially rectangular hysteresis loop, said core having at least three apertures linearly disposed therein to create a plurality of magnetic circuits each including an upper and a lower core section and an interconnecting leg, a cross section of one of said legs being at least equal to the sum of the cross sections of the remaining legs, said upper and lower core sections having cross sections at any position thereon at least equal to the sum of the cross sections of all the legs disposed on the side of said position remote from said one leg in order to allow passage of sufficient flux to saturate all of said legs, an input winding wound on said one leg, an A.C. input signal generator connected to said input winding, the signal from said generator having a magnitude sufficient to saturate at least a portion of said remaining legs alternately in both directions and to drive them out of saturation after a change in polarity of said signal at preselected times depending on their magnetic field intensities, a separate output winding wound on each of said remaining legs, and a pair of terminals on each of said output windings for obtaining individual output pulses therefrom during each cycle of said input signal.

12. An electrical signal delay device comprising a plurality of magnetic circuits, input winding means inductively coupled to said magnetic circuits, means for supplying said input winding means with an input signal of reversible polarity having sufficient magnitude to saturate at least a portion of each of said magnetic circuits first in one direction and then in the opposite direction, at least one of said circuits having a combined reluctance and ampere-turn energization different from the remaining circuits whereby said at least one circuit unsaturates and saturates at a different time from the remaining circuits during application of said signal, and output winding means coupled to each of said magnetic circuits for deriving an output signal during the times said circuits are in their unsaturated conditions.

References Cited in the file of this patent
UNITED STATES PATENTS

| | | |
|---|---|---|
| 2,673,337 | Avery | Mar. 23, 1954 |
| 2,740,110 | Trimble | Mar. 27, 1956 |
| 2,805,408 | Hamilton | Sept. 3, 1957 |